United States Patent
Kilim et al.

(10) Patent No.: US 11,389,997 B2
(45) Date of Patent: Jul. 19, 2022

(54) INJECTION MOULD

(71) Applicants: Rafael Zvi Karl Kilim, London (GB); Simcha Izhak Kilim, London (GB)

(72) Inventors: Rafael Zvi Karl Kilim, London (GB); Simcha Izhak Kilim, London (GB)

( * ) Notice: Subject to any disclaimer, the term of this patent is extended or adjusted under 35 U.S.C. 154(b) by 244 days.

(21) Appl. No.: 16/966,055

(22) PCT Filed: Dec. 27, 2018

(86) PCT No.: PCT/GB2018/053773
§ 371 (c)(1),
(2) Date: Jul. 30, 2020

(87) PCT Pub. No.: WO2019/158895
PCT Pub. Date: Aug. 22, 2019

(65) Prior Publication Data
US 2020/0353659 A1 Nov. 12, 2020

(30) Foreign Application Priority Data
Feb. 13, 2018 (GB) .................................... 1802299

(51) Int. Cl.
*B29C 45/38* (2006.01)
*B29C 45/27* (2006.01)
*B29C 45/26* (2006.01)

(52) U.S. Cl.
CPC ...... *B29C 45/2711* (2013.01); *B29C 45/2602* (2013.01); *B29C 45/38* (2013.01); *B29C 2045/2719* (2013.01)

(58) Field of Classification Search
None
See application file for complete search history.

(56) References Cited

U.S. PATENT DOCUMENTS

| 4,824,358 A | * | 4/1989 | Takeuchi | ............ B29C 45/2681 |
| | | | | 264/161 |
| 2010/0230848 A1 | * | 9/2010 | Miao | ....................... B29C 45/38 |
| | | | | 264/161 |
| 2011/0171338 A1 | * | 7/2011 | Han | ........................ B29C 45/38 |
| | | | | 425/226 |

FOREIGN PATENT DOCUMENTS

| CN | 201325156 Y | 10/2009 |
| GB | 2399535 A | 9/2004 |

OTHER PUBLICATIONS

International Search Report and Written Opinion of International Application No. PCT/GB2018/053773, dated Mar. 4, 2019, 10 Pages.

(Continued)

*Primary Examiner* — Armand Melendez
(74) *Attorney, Agent, or Firm* — Maine Cernota & Rardin

(57) ABSTRACT

An injection mould comprises first and second relatively movable mould halves defining at least one mould cavity between them, a first of the halves having a sprue through which moulding material is injected, a runner leading from the sprue to at least one gate into the or each mould cavity. The mould is characterised in that, when the mould halves are engaged one with the other, an insert projects from one mould half into a corresponding recess in the other mould half at a position corresponding to the or each gate into the mould cavity, the insert having a cutting groove extending therealong opening into an end face of the insert, the end face being in communication with the sprue and the opposite end of the groove being in communication with the gate, the groove thereby constituting at least a part of the runner, the groove extending at an acute angle to the relative direction of movement of the mould halves whereby, as the mould halves are separated, a cutting edge of the groove travels across the gate to shear the material in the gate.

7 Claims, 4 Drawing Sheets

(56) References Cited

OTHER PUBLICATIONS

International Preliminary Report On Patentability of International Application No. PCT/GB2018/053773, dated Aug. 18, 2020, 6 pages.

* cited by examiner

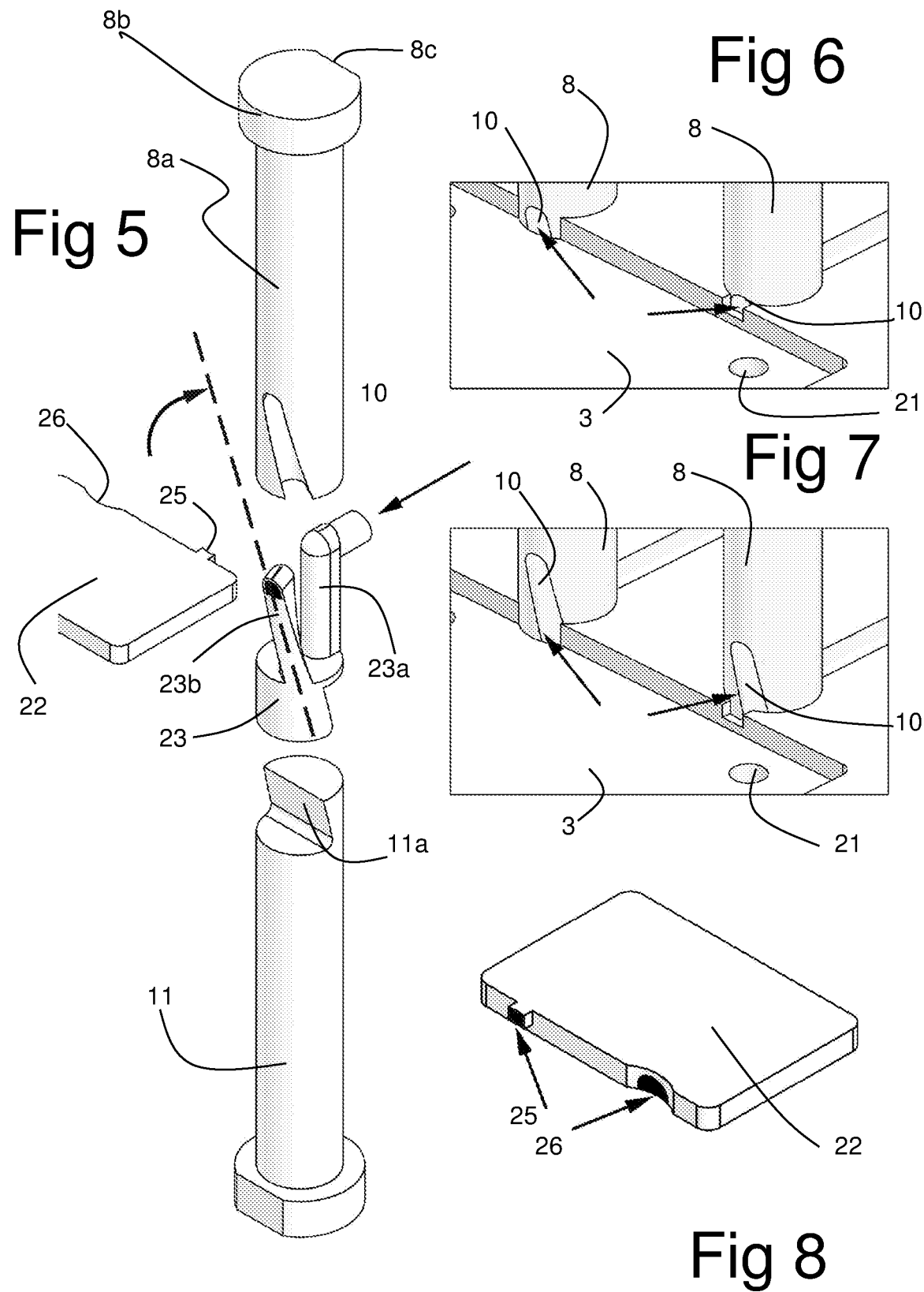

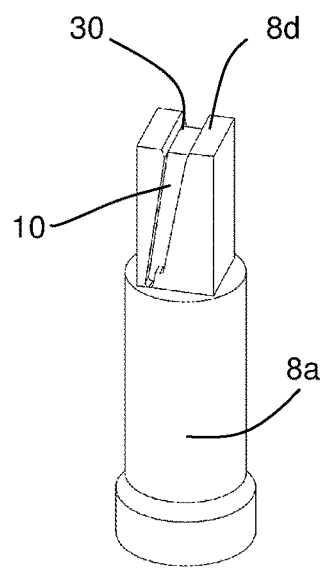
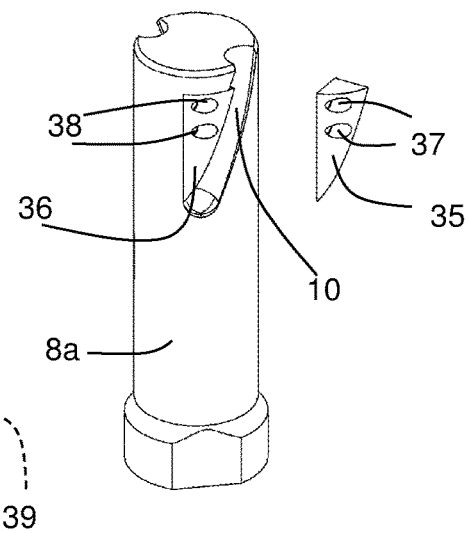
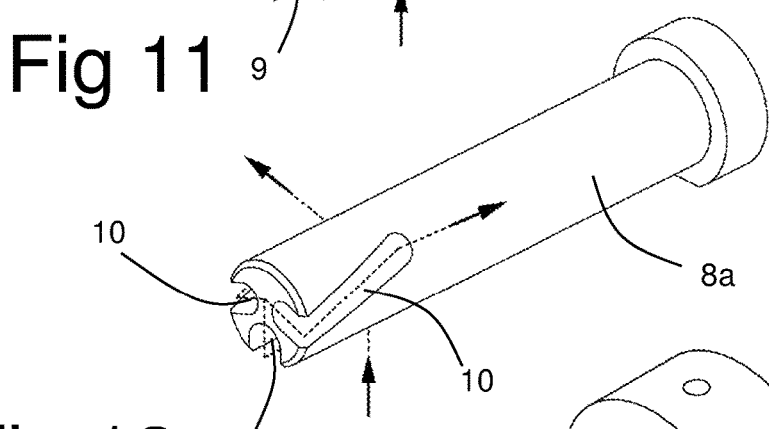
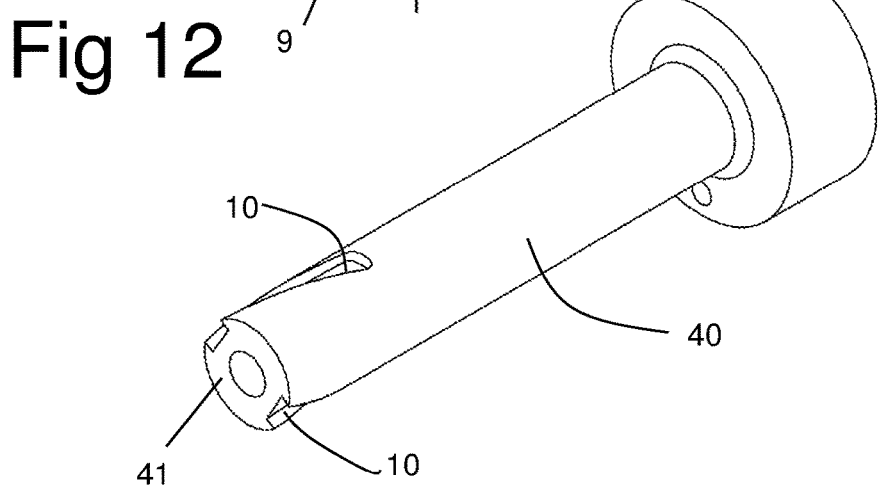

INJECTION MOULD

RELATED APPLICATIONS

This application is a national phase application filed under 35 USC § 371 of PCT Application No. PCT/GB2018/053773 with an International filing date of Dec. 27, 2018, which claims priority of GB Patent Application 1802299.6 filed Feb. 13, 2018. Each of these applications is herein incorporated by reference in its entirety for all purposes.

FIELD OF THE INVENTION

This invention relates to an injection mould, for example for use in moulding plastics materials.

BACKGROUND TO THE INVENTION

Injection moulding is a manufacturing process for producing components by injecting material into a mould. Injection moulding can be performed with a host of materials. Material for the component is fed into a moulding machine heated barrel, mixed, and forced into a mould cavity through a sprue bush in the mould. The molten plastic material travels from the sprue bush through runners linking to the component in the mould. When the moulded articles are ejected they are ejected with all the runners and sprue bush as one unit. It is preferred to break the link between the sprue bush and the runners and moulded components to reduce the amount of handling—that is, finishing and trimming.

SUMMARY OF THE INVENTION

The invention relates to an injection mould, comprising first and second relatively movable mould halves defining at least one mould cavity between them, a first of the mould halves having a sprue through which moulding material is injected, a runner leading from the sprue to at least one gate into the or each mould cavity, characterised in that, when the mould halves are engaged one with the other, an insert projects from one mould half into a corresponding recess in the other mould half at a position corresponding to the or each gate into the mould cavity, the insert having a cutting groove extending therealong opening into an end face of the insert, the end face being in communication with the sprue and the opposite end of the groove being in communication with the gate, the groove thereby constituting at least a part of the runner, the groove extending at an acute angle to the longitudinal axis of the insert whereby, as the mould halves are separated, a cutting edge of the groove travels across the gate to shear the material in the gate.

The or each insert preferably has a second groove extending therealong spaced apart from the cutting groove and opening into the end face of the insert, the end of the groove remote from said end face communicating, when the mould halves are engaged, with a runner extending from a central sprue.

The mould opening stroke of an injection moulding machine provides the relative movement for cutting the gate runner from the plastic component and is then typically followed by ejector movement ejecting the component and runner.

This mould may also have a puller arrangement (a known method used in moulds) for keeping the sprue and runner tree inside the mould moving half during the first half of the mould opening movement. This may serve to hold back the sprue and runner, while the relative movement between the cutting groove of the insert and the moulded material produces a gentle cutting action to separate the moulded article from the runner tree.

The insert may be a cylindrical metal insert in the form of a pin whose head is retained within the body of the mould and has at one side a flat surface to prevent rotation of the insert about its longitudinal axis.

The metal insert may be installed into the stationary half of the mould with the grooved part protruding from the surface of the mould when the mould halves are separated. Opposite this insert a receiving bore is formed in the moving half of the mould, preferably with a puller or pullback pin operating opposite the insert inside this bore.

The injection mould of the invention is suitably used for moulding plastics, although it will be appreciated that it is not limited to use with plastics materials. Any material that can be injection moulded may be used with the mould of the invention.

In one embodiment of the invention, during the mould fill sequence the plastic material is forced to flow through the sprue taper bore through the runner groove into the slot on the insert under the face of the insert and up through the slant groove into the mould cavity. The plastic material solidifies and during opening of the mould moving half the pullback pins stop the sprue and runner from being released.

During the mould opening movement the insert slant groove forces slight bending and releasing of the plastic runner, also creating gentle side shearing action at the same time, using the gate wall or plastic component wall as the stationary opposing cutting edge. During ejection, all moulded components and the sprue and runners are ejected already cut individually.

The same slant grooves can be cut into a sprue bush small diameter body to create a sprue bush cutting element.

The insert can be manufactured as a metal part by machining including: milling, turning, grinding, metal injection, sintering and it can be heat treated to improve properties. It can have a coating for reducing the coefficient of friction and improved hardness characteristics. It can also be a carbide insert.

The cutting edge can be improved by adding back, angle grinding or serration.

BRIEF DESCRIPTION OF THE DRAWINGS

In the drawings, which illustrate exemplary embodiments of the invention:

FIG. 5 is an exploded view of a retaining pin, a section of the runner and the moulded component, with a cutting insert in accordance with FIG. 1;

FIG. 6 is an enlarged detail view of a mould cavity with 2 cutting inserts during the fill cycle where the pins are located, the first for cutting on the gate land and the second for cutting on the moulded component;

FIG. 7 is a view corresponding to that of FIG. 6, showing the mould during the opening movement to illustrate the cutting action;

FIG. 8 shows the moulded component of FIG. 5 with the 2 possible locations for cutting;

FIG. 9 is a perspective view of a rectangular cutting insert according to another embodiment of the invention;

FIG. 10 shows a perspective view of a cutting insert with interchangeable hard metal inserts;

FIG. 11 shows a cutting insert that can be secured with a screw so it can be installed from the front face of the mould;

FIG. 12 shows a cutting insert providing one entry runner with two cutting feed grooves so that it can feed two mould cavities and cut two gates (multi-gate cutting insert); and FIG. 13 shows a sprue bush feeding plastic material through the centre and incorporating cutting grooves to enable the sprue bush to cut runners or gates placed near the sprue bush in accordance with yet another embodiment of the invention.

DETAILED DESCRIPTION OF THE ILLUSTRATED EMBODIMENTS

Figure 1:
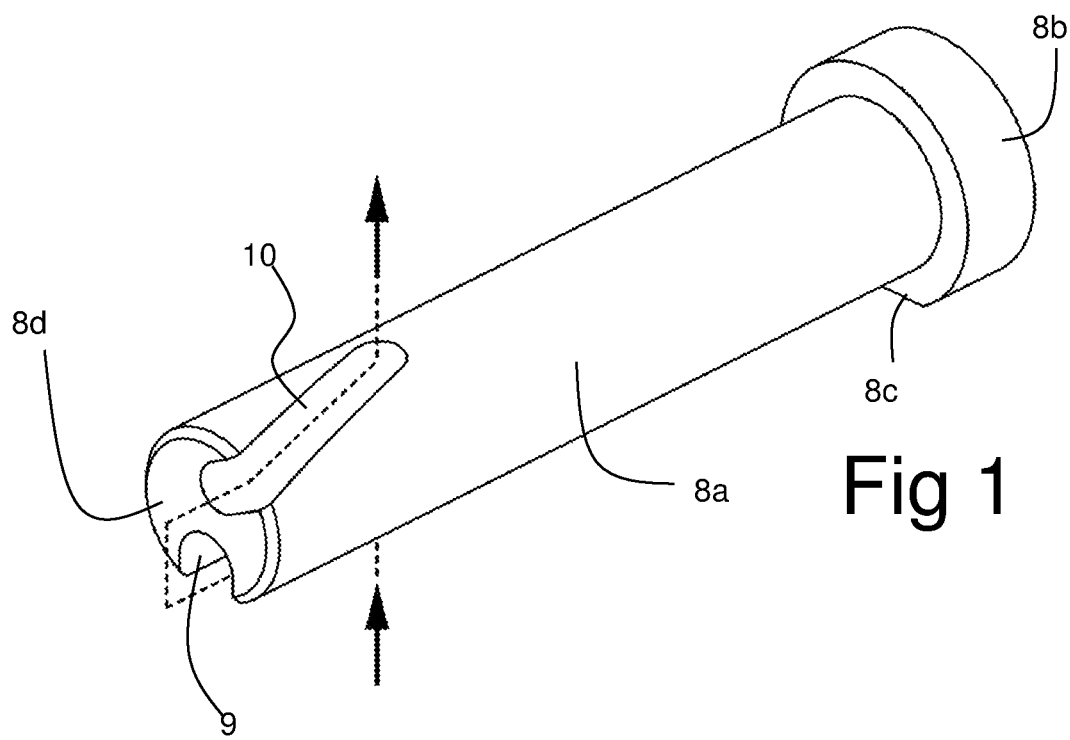
FIG. 1 is a perspective view of a cutting insert for use in a mould according to one embodiment of the invention.
Figure 2:
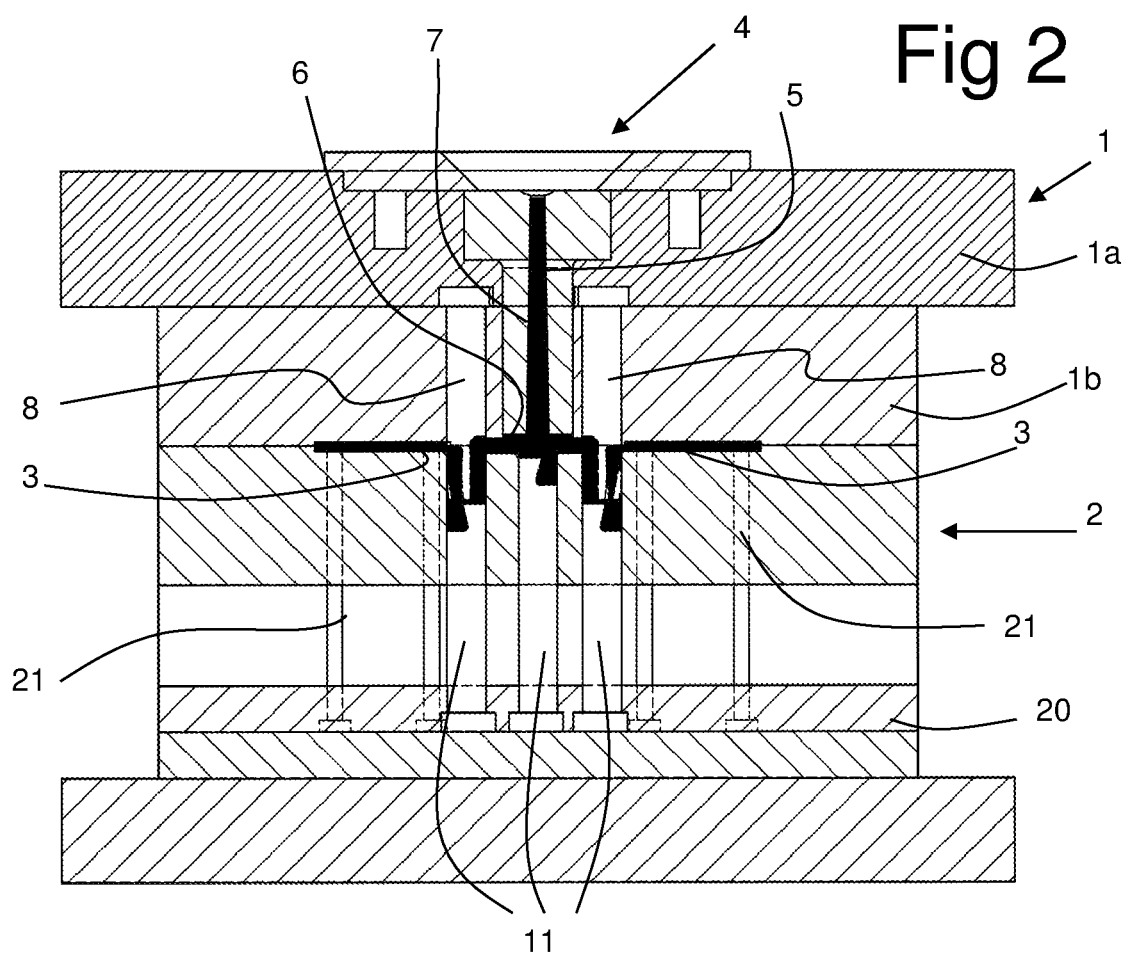
FIG. 2 is a vertical section through a closed mould incorporating 2 cutting inserts and 2 cavities, the mould having been filled with plastic material during injection.

Referring first to FIGS. 1 to 4, an injection mould comprises a stationary mould half 1 and a movable lower half 2, with mould cavities 3 defined between them when closed together as illustrated in FIG. 2. The upper half includes an injection port 4 communicating with a sprue 5 feeding runners 6, in turn leading through gates into the mould cavities 3. The stationary mould half 1 comprises an upper block 1a and a lower block 1b, the injection port 4 being fixed in the upper block and the sprue 5 being provided through a body 7 extending through the upper and lower blocks 1a and 1b.

Figure 3:
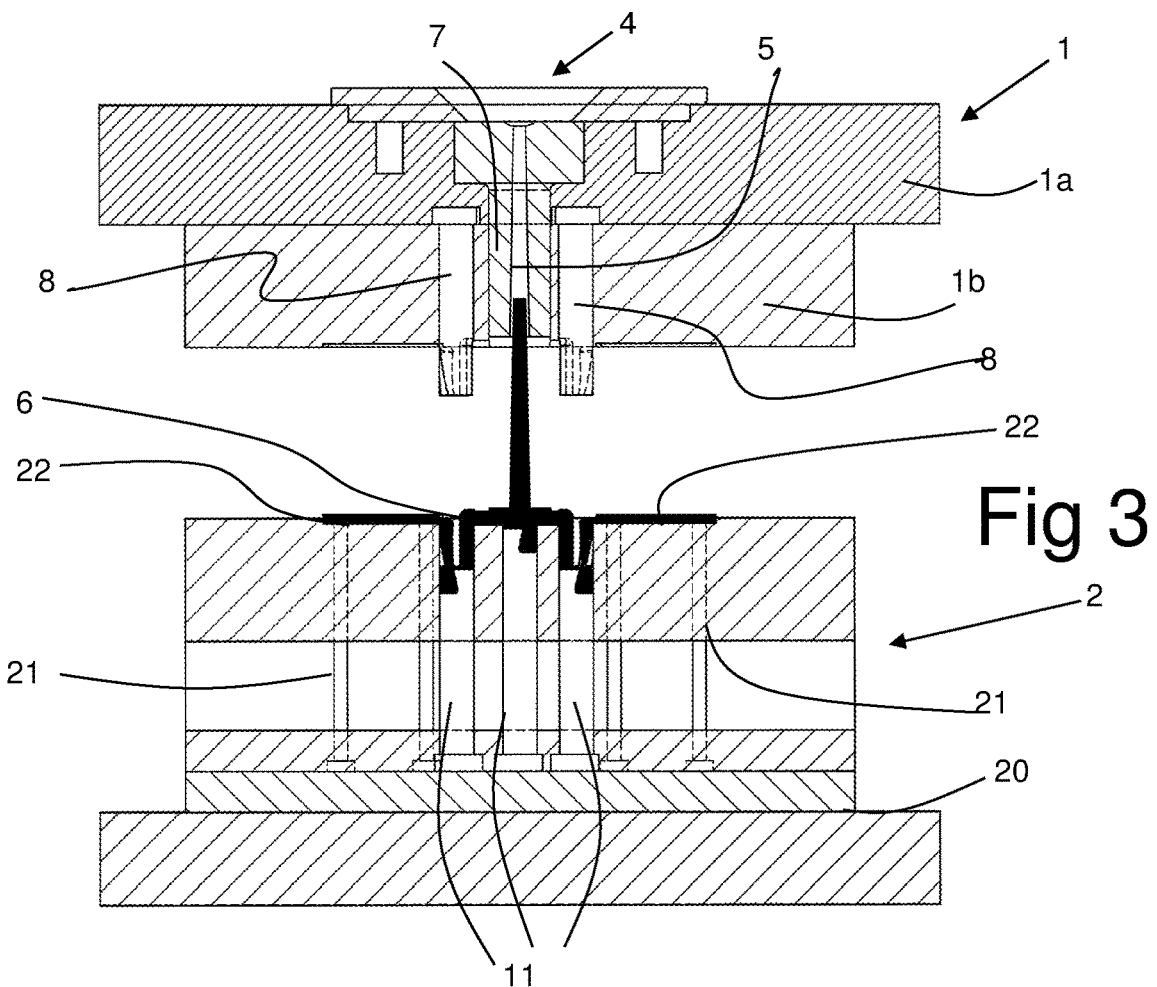
FIG. 3 is a view corresponding to that of FIG. 2, but showing the injection mould fully opened after cutting the connection between the moulded articles and the runner.

Inserts 8, shown in more detail in FIG. 1, consist of a cylindrical body 8a with an enlarged head 8b at one end thereof. The head 8b is generally cylindrical, but has a flat, cut-off portion 8c which is used to prevent rotation of the insert in use. Each insert 8 is mounted with its head 8b in a correspondingly-shaped recess in the face of the upper block 1a and the body 8a extending through the lower block 1b so that a portion of the body projects from the lower face of the lower block. This projecting portion is provided with a pair of grooves 9 and 10 extending along the cylindrical surface and spaced apart circumferentially. One groove 9 extends parallel to the longitudinal axis of the insert, opening at the end face 8d of the insert remote from the head 8b, and serves as part of the runner from the sprue 5 towards the mould cavity, while the other, cutter, groove 10 extends from the end face 8d in a direction which makes an acute angle with a plane through the longitudinal axis. The cutter groove 10 communicates at its upper end with the mould cavity when the two halves of the mould are closed together. In this position, the end face 8d of the insert opposes and is spaced from the end of a corresponding pull-back pin 11, hereinafter described in more detail with reference to FIG. 5. The function of the pull-back pin 11 is to pull back on or retain the material in the runners and sprue as the mould halves are separated, as illustrated in FIG. 3.

Figure 4:
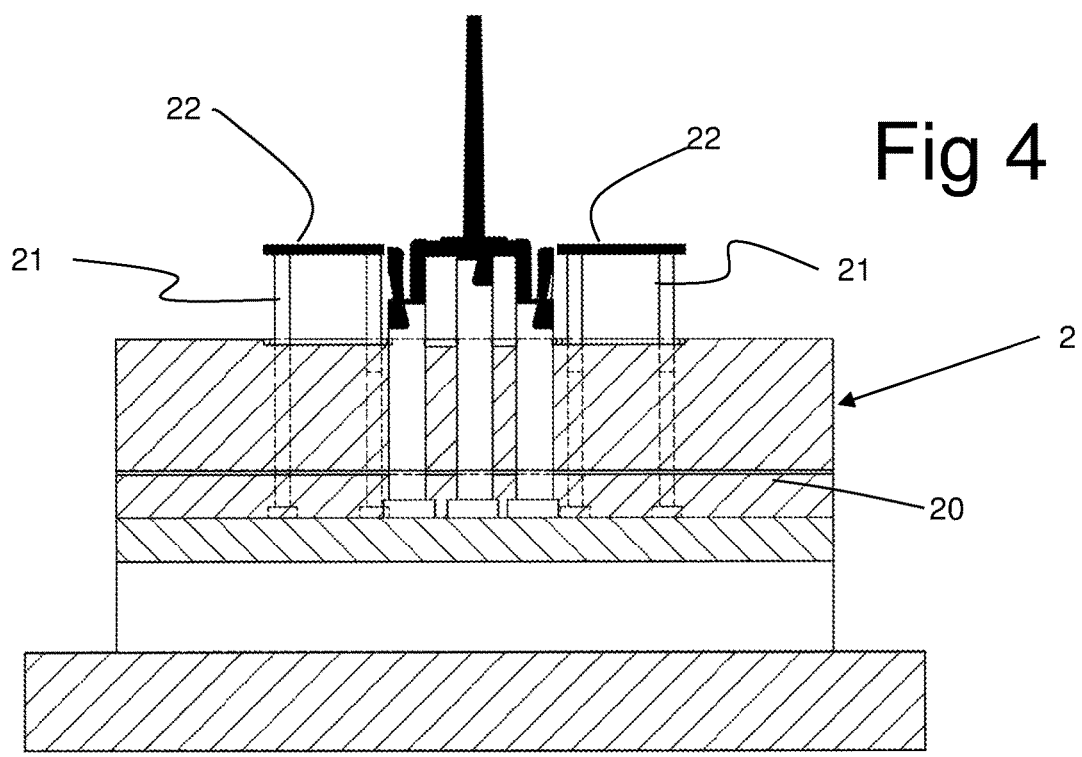
FIG. 4 is a view of the movable half of the mould of FIGS. 2 and 3, half opened whilst ejecting the separated plastic component.

FIG. 4 shows the movable mould half 2 during ejection therefrom of the moulded components and associated runners and sprue contents. An ejector plate 20 is mounted on the lower half of the mould and is relatively movable. The heads of the pull-back pins 11 and various ejector pins 21, which extend through the mould half, are fixed within the ejector plate so that they can slide through the body of the movable half of the mould when the ejector plate moves up, thereby pushing the associated moulded components clear of the mould half.

The action of the cutter grooves 10 will now be explained with reference to FIGS. 5 to 8. FIG. 5 shows the insert 8, the pull-back pin 11, a moulded article 22 and the portion of the runner material associated with these components. The pull-back pin 11 has an undercut end portion 11a creating a cavity in association with the surrounding bore in the mould half containing it which is filled with the moulding material, typically molten plastic material, during the moulding process. This creates, after solidification of the material, a shaped plug 23 engaged with the portion 11a and retained by it until the moulded material is ejected. The plug 23 has a first runner portion 23a, corresponding to the longitudinally-extending groove 9 in the insert 8 and a second runner portion 23b corresponding to the angled cutter groove 10 in the insert. The second runner portion 23b connected to the moulded article 22 through a gate portion 25. As the two mould halves 1 and 2 are separated, the portion 23b moves downwardly through the groove 10 and the angle of the groove causes the portion 23b to bend, while bringing the sharp edge of the groove 10 across the gate portion 24. The combination of these actions causes shearing of the gate portion to separate the moulded article 22 from the plug 23.

FIGS. 6 and 7 show the two alternative relationships between the insert 8, the groove 10 therein and the different shearing effect achieved. FIG. 6 shows the position with the mould halves closed. One insert 8 is spaced slight from the mould cavity 3 to create a more pronounced gate moulding between the runner in the groove 10 and the moulded article, while the other insert 8 protrudes slightly into the cavity so that the plastic material flows directly from the groove 10 into the cavity. FIG. 7 illustrates the cutting action as the mould halves are separated. Where there is a more pronounced gate moulding, the edge of the groove passes through the resulting gate moulding to shear it leaving a small amount of plastic 25 protruding from the article 22. Where the insert protrudes into the cavity, the shearing action as the mould halves separate and the insert withdraws cuts a small curved indentation 26 in the side of the moulded article 22. The difference between the two is illustrated by FIG. 8.

FIG. 9 illustrates an alternative form of insert in which the projecting portion of the insert which engages in a corresponding recess in the second half of the mould has a square or rectangular cross-section. The angled groove 10 and the other groove 9 are joined together in forming a runner by an additional groove 30 extending across the end face 8d of the insert.

FIG. 10 shows an insert having a replaceable cutter forming one side of the angled groove 10. The cutter 35 is in the form of a curved segment which is located in a corresponding recess 36 in the insert and held in place by set screws (not shown) passing through apertures 37 in the cutter and engaging in corresponding threaded holes 38 in the recess 36. The use of the replaceable cutter 35 avoids the need for replacement of the entire insert when the cutting edge becomes worn through extended use.

FIG. 11 illustrates an insert which is provided with a threaded bore 39 in place of the head 8a, the insert being fixed in place in the mould half by means of a screw engaging the bore 39.

FIG. 12 shows an insert having two opposed angled grooves 10 feeding two separate mould cavities through separate gates and arranged two shear each of them as the mould halves are separated, in the manner hereinbefore described.

FIG. 13 illustrates a sprue bush 40 which is configured with two opposed angled or cutter grooves 10, plastics material being injected through the sprue bush to emerge at the end face 41 thereof. The bush 40 will be arranged in the mould so that the end face 41 opposes and is spaced from a pull-back pin, for example as shown in FIG. 5, so that injected material fills the space between them and flows into the grooves 10 and thence to respective mould cavities.

The invention claimed is:

1. An injection mould, the injection mould comprising:
first and second relatively movable mould halves defining at least one mould cavity between them,
wherein a first of the mould halves comprises a sprue through which moulding material is injected and a runner leading from the sprue to at least one gate into the or each mould cavity,
wherein, when the mould halves are engaged one with the other, an insert is configured to project from one mould half into a corresponding recess in the other mould half at a position corresponding to the or each gate into the mould cavity, the insert having a cutting groove extending along a side surface of the insert and a second groove extending therealong spaced apart from the cutting groove, both the cutting groove and second groove opening into an end face of the insert and,
wherein the end face is in communication with the sprue and the opposite end of the groove is in communication with the gate, the groove thereby constituting at least a part of the runner, the groove extending at an acute angle to the longitudinal axis of the insert,
wherein the insert is configured to allow resin to travel from the second groove, over the end face, to the cutting groove, and
wherein, as the mould halves are separated, a cutting edge of the groove is configured to travel across the gate and shear the material in the gate.

2. The injection mould according to claim 1, wherein the insert is a sprue bush, the sprue extending longitudinally therethrough, opening at the end face.

3. The injection mould according to claim 1, wherein the end face of the or each insert opposes the end of a pull back pin.

4. The injection mould according to claim 1, wherein the insert is cylindrical.

5. The injection mould according to claim 1, wherein the insert is rectangular in section.

6. The injection mould according to claim 1, wherein the insert is provided with more than one cutting groove, each cutting groove being associated with a respective gate to a mould cavity.

7. The injection mould according to claim 1, wherein the cutting edge is provided by a removable and replaceable segment of the insert.

* * * * *